Patented Jan. 26, 1932

1,842,768

UNITED STATES PATENT OFFICE

WILLIAM A. ROOKER AND VICTOR E. SPEAS, OF KANSAS CITY, MISSOURI, ASSIGNORS TO SPEAS MFG. CO., OF KANSAS CITY, MISSOURI, A CORPORATION OF MISSOURI

PRODUCTION OF JELLY-LIKE FOOD PRODUCTS

No Drawing.   Application filed August 5, 1929.   Serial No. 383,772.

The present invention relates to the production or making of jelly-like food products, such as jellies, jams, marmalades, preserves, conserves, confections and other like, similar and kindred products, and relates more particularly to the means and method of retarding the set in or jelling of the product.

In the making of such a product, which will have the desired stiff consistency and firmness, there are three essential ingredients,—sugar, pectin and acid—which must be properly combined. Fruits are deficient in some one or more of these and the deficiency is supplied by the manufacturer by adding pectin (which may be a commercial pectin preparation), sugar or fruit acid. Most fruits are either lacking in acid or their total acidity is not available for jell formation because of the buffer action of the fruit salts or other causes. Consequently, it is usual to add an acid.

The usual practice is to mix the correct amounts of the ingredients in a suitable kettle and then cook the mass until the desired concentration is obtained. When all of the ingredients are cooked together, the mass often solidifies or sets in the kettle before it can be poured. To overcome this difficulty, it is usual to place the acid solution in the containers before pouring the hot product into them. This practice enables pouring of the mass without any setting action taking place in the cooking vessel, but it does not insure an even distribution of the acid throughout the mass and it does not prevent the entrapment of air bubbles or scum that, because of rapid thickening or jelling of the mass, cannot come to the top, as would be the case if the mass retained a syrupy condition or thinner consistency for even a few minutes. The equipment required for depositing accurately measured quantities of acid into each container, however, is too expensive for small companies.

Fruit jams and jellies prepared for candy work are necessarily of much stiffer consistencies or firmer sets than the jams and jellies packed by preservers. In fact, the candy maker uses from 50% to 100% more pectin in his batches than the preserver would use for the same weight of finished product. Also, to prevent any spoilage in his finished candy, the confectioner finishes his jams and jellies with much higher sugar contents than is the usual practice with preservers. Unfortunately, the higher the pectin or sugar content, the more quickly will the mass set when the necessary acid is added. Nor can the candy maker place his acid solution in the containers, for his jams or jellies are either deposited in starch moulds or poured out on metal or stone slabs to set in a comparatively thin sheet. In either case, the acid must be added to the batch before pouring and the difficulties encountered have drastically limited the production of confections of this class, despite the fact that confectioners are universal in their approval of fruit jam and jelly confections, as far as consumer appeal is concerned.

Our invention comprehends the adding of the acid to the mass in such form or character as to retard the setting or jelling of the mass whereby the mass will retain a thin consistency or syrup form for sufficient time to enable the preserver or confectioner to pour or cast the product before any thickening or setting action takes place. And because of the slow setting action, any entrapped froth or scum will come to the top, thus improving the clarity and general appearance of the finished product.

In contrast to present practices of adding the acid in the form of a solution of acid, we add the acid in dry form, preferably dispersed by powdered sugar or a heavy sugar syrup. Glycerine may also be used as the dispersing agent, but we prefer the use of either the dry sugar or the heavy sugar syrup, as sugar is a normal ingredient of jams and jellies.

As a result of adding the acid in dry form instead of dissolving it in water, the setting action is delayed, for the acid must be in solution before it can take part in the formation of the jell. On standing the acid gradually dissolves in the jam or jelly and the setting action takes place. The dry acid, being well mixed with the mass, is uniformly suspended throughout the mass and due to the ease of diffusion of solutions in a colloidal gel, the acid, on dissolving, soon diffuses evenly throughout the product.

By way of illustrating our invention, the following is an example of its application to the preparation of a pectin-sugar jelly:

| | |
|---|---|
| No. 80 pectin | 1 lb. |
| Cane sugar | 80 lbs. |
| Fruit juice or water | 8½ to 9 gals. |
| Glucose—42° Baumé | 1 lb. |
| Dry acid | 7 oz. |

The glucose may be dispensed with and one pound of the sugar used in its place. The acid may be tartaric, citric, malic or any other dry acid used in the manufacture of food products.

The pectin is dissolved in the juice or water in the usual manner and the sugar is then added. The cooking is continued until the desired sugar concentration is obtained, as indicated by the temperature or weight of the boiling mass. The dry acid is mixed with the glucose or one pound of the sugar and when the batch is ready to be poured, this sugar-acid mixture is added and mixed into the mass. The batch is then poured into the containers.

The example given illustrates the application of our invention to products of the nature of jams, jellies, preserves and marmalades. In practice, we have found that for average purposes, the dry acid powder or acid crystals give very good results when they are of such fineness that they will pass through a 30 mesh screen and be retained by a screen of 40 mesh. By using acid of coarser mesh, the setting may be further retarded, as the larger acid particles go into solution at a slower rate. However, we do not wish to limit our invention to the use of acid of any particular mesh and mention this feature only to illustrate the flexibility of our invention in its application to plant work. As long as the acid is in dry form, the setting action will be retarded as desired; increasing the size of the acid particles only increases the slow setting action.

The expression "dry particles" used herein, is used in the sense to cover powders, granules, crystals and the like.

While we have herein disclosed an illustrative embodiment of the invention and a method of producing the same, it is to be understood that the invention is not limited thereto but comprehends other compositions and process steps without departing from the spirit of the invention.

Having thus disclosed the invention, we claim:

1. The process of making a jelly-like product, comprising the step of adding to a hot solution of pectin, sugar and water or fruit juice, an acid in the form of dry particles to slowly dissolve and diffuse in the mass.

2. The process of making a jelly-like product, comprising the steps of forming a hot solution of pectin, sugar and water or fruit juice, admixing said hot solution with an acid in the form of dry particles, and cooling the mass for jellification.

In witness whereof, we hereunto subscribe our names to this specification.

WILLIAM A. ROOKER.
VICTOR E. SPEAS.